Feb. 8, 1966  J. POUILLOUX  3,234,070
INFLATABLE TIRE BUILDING DRUM
Filed Dec. 18, 1961
FIG. 1
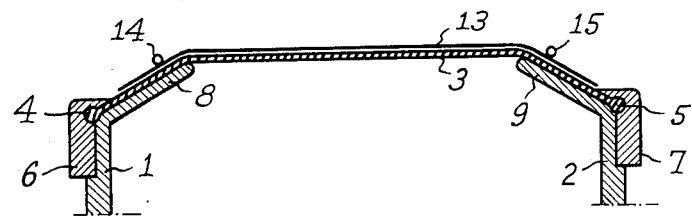
FIG. 2
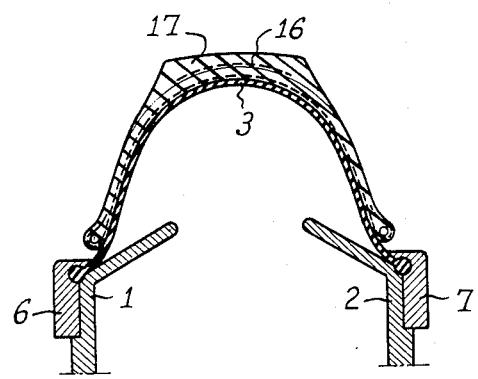
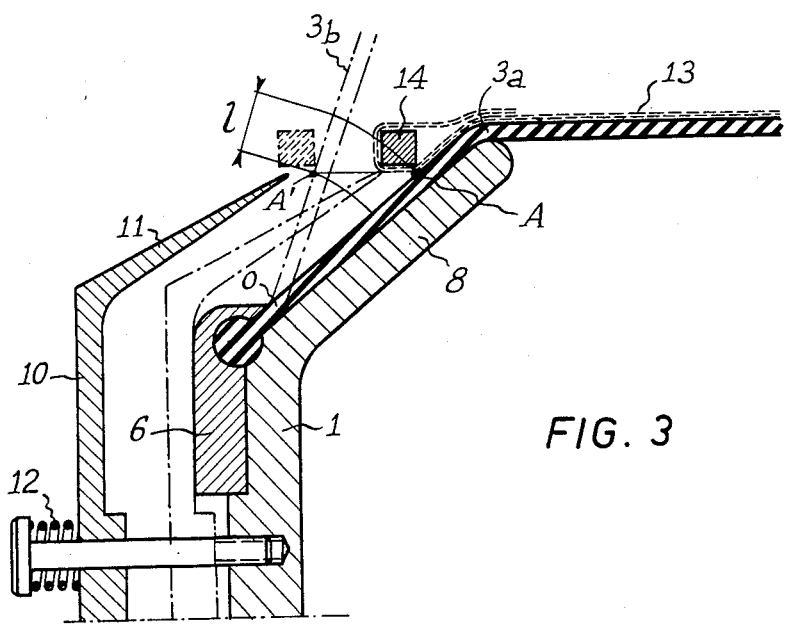
FIG. 3

3,234,070
INFLATABLE TIRE BUILDING DRUM
Jacques Pouilloux, 58 Rue Soeur Angele,
Saint-Gratien, France
Filed Dec. 18, 1961, Ser. No. 159,834
Claims priority, application France, Dec. 19, 1960,
847,526
3 Claims. (Cl. 156—416)

Drums for manufacturing outer covers for tires, constituted by two coaxial flanges or cheeks between which a flexible tubular membrane, which is inextensible in the axial or longitudinal direction, is stretched, are already known.

In a first step in the manufacture of a tire, the flanges or cheeks are apart and the membrane is cylindrical. In a second step, the flanges are moved toward each other, and the membrane is inflated to assume a toroidal shape. The passing from the first to the second step corresponds to the shaping operation of the outer cover.

In this type of drum it is noted that after the compressed air has been admitted and the flanges brought together the exterior development of the membrane in an axial direction is frequently too small in relation to the carcass of the tire. This carcass is consequently not put under tension and its deformation is inadequate.

It is an object of my invention to remedy the drawbacks of this type of drum. It is another object of my invention to provide a drum of the type comprising an annular flexible membrane which is inextensible in the axial direction, said membrane being held between two circular flanges which can be brought together or separated, and wherein, during the shaping, the beads of the outer cover are made to slip in relation to the membrane, in such a way that the length of the membrane between the beads is increased, thus allowing the tension of the carcass to be increased.

The invention effects these objects by providing a drum for the manufacture of tires in which the flanges supporting the membrane are cut off or truncated cones with their major bases inwards, the membrane being secured to the minor base side and resting on the conical or sloping part when the flanges are separated.

In order that the invention may be more clearly understood, reference will now be made to the accompanying drawings which show one embodiment thereof by way of example and in which:

FIGURE 1 shows a part view of a drum in developed position, in cross section,

FIGURE 2 shows the drum of FIGURE 1 in contracted position, during the shaping operation, and FIGURE 3 is a part and detailed view to a larger scale.

Referring to the drawings, a drum according to the invention comprises two lateral flanges 1 and 2 on which a flexible annular membrane 3 is secured, said membrane being inextensible in the axial direction, and being reinforced for example by longitudinal cables. Fixing is obtained by wedging the beads 4 and 5 of the membrane by means of rings 6 and 7 suitably mounted on flanges 1 and 2. The drum is supported upon a shaft not shown.

According to the invention, the flanges 1 and 2 have ends 8 and 9 which have a truncated conical shape. The membrane is fixed by rings 6 and 7 to the minor base of these part-cones. When the flanges are separated and the membrane stretched, the latter is applied to the conical part of ends 8 and 9. The rims of these ends are rounded in order that they do not damage the membrane.

If desired, the drum may have guide members 10 for the beads of the outer cover on each side of the flanges 1 and 2. These guide members have truncated conical flanks 11 corresponding to the ends 8 and 9 of the drum flanges and are held against these flanges by springs 12.

When the membrane is stretched, these guide members are applied against flanges 1 and 2 in the position shown in chain-dotted lines in FIGURE 3.

The drum described above is used in the following manner:

Firstly the plies of the carcass 13 are distributed on the cylindrical member 3 in such a way that the edges of these plies lie on the corresponding conical parts of the ends 8 and 9 (FIGURE 1). Bead cores 14 and 15 of the tire are then put in place and the edges of plies 13 are folded over the top in the usual manner.

When the drum includes the guide members 10, the edges of the plies of the carcass 13 are applied above the edges 11 of these guide members, the main function of which is then to ensure that the bead cores 14 and 15 are correctly placed in such a way that they are well centered and located in planes perpendicular to the axis of the drum.

The outer cover is subsequently manufactured in the usual manner, and this manufacture may include the addition of protectors 16 and the tread 17 according to the type of tire produced.

At this stage of manufacture the beads reinforced with bead cores 14 and 15 rest on the ends 8 and 9 through the membrane. They are in contact with the membrane at a point indicated by A on FIGURE 3.

The following operation consists in shaping the envelope in order to give it a toroidal form. With this object in view, flanges 1 and 2 are brought together and compressed air is fed into the drum in order to inflate the membrane 3 (FIGURE 2). During this operation the parts of the membrane located on the ends 8 and 9 go from position 3a to position 3b (FIGURE 2).

Since bead cores 14 and 15 are inextensible, a slipping of the beads in relation to the membrane occurs, these beads finally arriving in position A' shown in FIGURE 3. This slipping which is measured by difference "1" between radii OA and OA' in relation to the centre of rotation O of the membrane, enables the developed length of the membrane to be increased between the two beads of the outer cover during shaping.

Thus, the carcass of the tire can be tensioned and a more definite deformation achieved.

When the drum comprises guide members 10, the beads of the outer cover continue to rest against rims 11 of these members which separate themselves elastically from flanges 1 and 2 under the thrust of the inflated membrane.

To summarise, the invention enables the apparent development of the flexible membrane to be increased in a very simple manner in order that the envelope can be tensioned during shaping.

It is clear that the invention is not limited to the above described embodiment, to which various modifications may be made. For instance ends 8 and 9 may have a more or less accentuated spherical form instead of the truncated form illustrated on the drawing.

In the same way, a flexible membrane of limited extensibility can be used with this drum. The extension of the membrane would then combine with the sliding of the beads to ensure that the outer cover is tensioned.

What I claim is:

1. In an inflatable drum for building and shaping tires, two spaced coaxial rigid end members adapted to be moved axially toward and away from each other, each of said members including an integral peripheral flange of truncated conical shape with the major diameter portion of each flange disposed axially inwardly, a flexible tubular membrane, and means fixedly securing the edges only of said membrane to the outer surfaces of the end members adjacent the minor diameter portions of their flanges so that portions of said membrane rest upon the inclined portions of said flanges when the end members are separated the maximum distance and move therefrom when inflation fluid is introduced into said drum and the axial separation of said end members is reduced.

2. In an inflatable drum for building and shaping tires, two spaced coaxial rigid end members adapted to be moved axially toward and away from each other, each of said end members including an integral peripheral flange of truncated conical shape, the said members being disposed with the major diameter portions of their flanges axially inwardly, a flexible tubular membrane substantially axially inextensible, means fixedly securing the edges only of said membrane to the end members adjacent the minor portions of their flanges so that portions of said membrane rest upon the said flanges when the end members are separated the maximum distance and move therefrom when inflation fluid is introduced into said drum and the axial separation of said members is reduced, and a guide member supported on the axial outer face of each end member for limited axial movement relative thereto, each of said guide members including a truncated conical surface generally complementary to and overlying a portion of the truncated conical flange portion of the end member on which it is mounted, and the support means for said guide members including resilient means normally urging the guide members toward said end members.

3. In an inflatable drum for building and shaping tires, two spaced coaxial end members each having a peripheral flange inclined in an axial direction with the major diameter portions of said flanges disposed axially inwardly, a flexible tubular membrane, means securing the edges of said membrane to the end members adjacent the minor diameter portions of their flanges so that portions of said membrane rest upon the inclined portions of said flanges when the end members are separated the maximum distance and move therefrom when inflation fluid is introduced into said drum and the axial separation of said end members is reduced, and a tire bead guide member supported on the axially outer face of each end member, each of said guide members having a truncated conical peripheral portion generally complementary to and overlying a portion of the truncated conical flange of the end member, the supporting means for said guide members including resilient means permitting limited movement of the guide members axially relative to the end members.

References Cited by the Examiner
UNITED STATES PATENTS

| | | | |
|---|---|---|---|
| 1,789,143 | 1/1931 | Kraft | 156—416 |
| 2,084,009 | 6/1937 | Sohl | 156—416 |
| 2,182,176 | 12/1939 | Maranville | 156—416 |
| 3,035,629 | 5/1962 | Vanzo et al. | 156—416 XR |
| 3,097,985 | 7/1963 | Heuze | 156—416 |
| 3,111,445 | 11/1963 | Pouilloux | 156—416 |

ALEXANDER WYMAN, *Primary Examiner.*

MICHAEL V. BRINDISI, *Examiner.*

UNITED STATES PATENT OFFICE
CERTIFICATE OF CORRECTION

Patent No. 3,234,070 February 8, 1966

Jacques Pouilloux

It is hereby certified that error appears in the above numbered patent requiring correction and that the said Letters Patent should read as corrected below.

In the grant, line 3, after "France," insert -- assignor to Societe Anonyme dite: Kleber Colombes Pneumatiques, Caoutchouc Manufacture Et Plastiques, of Colombes, France, --; line 12, for "Jacques Pouilloux, his heirs" read -- Societe Anonyme dite: Kleber Colombes Pneumatiques, Caoutchouc Manufacture Et Plastiques, its successors --; in the heading to the printed specification, lines 3 and 4, for "Jacques Pouilloux, 58 Rue Soeur Angele, Saint-Gratien, France" read -- Jacques Pouilloux, Saint-Gratien, France, assignor to Societe Anonyme dite: Kleber Colombes Pneumatiques, Caoutchouc Manufacture Et Plastiques, Colombes, France --; column 3, line 14, after "minor" insert -- diameter --.

Signed and sealed this 20th day of December 1966.

(SEAL)
Attest:

ERNEST W. SWIDER
Attesting Officer

EDWARD J. BRENNER
Commissioner of Patents